US012686511B2

(12) United States Patent　　　　　　(10) Patent No.:　US 12,686,511 B2

Miller et al.　　　　　　　　　　　　　(45) Date of Patent:　Jul. 21, 2026

(54) PAYLOAD ASSEMBLY FOR MOBILE PLATFORMS

(71) Applicants:Eagle Technology, LLC, Melbourne, FL (US); Florida Atlantic University Board of Trustees, Boca Raton, FL (US)

(72) Inventors: Warner Allen Miller, Boca Raton, FL (US); Michael Lange, Melbourne, FL (US); Victor Bucklew, Richmond, VA (US); Samuel Knarr, Melbourne, FL (US)

(73) Assignees: Eagle Technology, LLC, Melbourne, FL (US); Florida Atlantic University Board of Trustees, Boca Raton, FL (US)

( * ) Notice: Subject to any disclaimer, the term of this patent is extended or adjusted under 35 U.S.C. 154(b) by 77 days.

(21) Appl. No.: 18/431,223

(22) Filed: Feb. 2, 2024

(65) Prior Publication Data

US 2025/0250035 A1　　　Aug. 7, 2025

(51) Int. Cl.
*B64U 20/80*　　　　　(2023.01)

(52) U.S. Cl.
CPC ........ *B64U 20/80* (2023.01); *B64U 2201/104* (2023.01); *B64U 2201/20* (2023.01)

(58) Field of Classification Search
CPC ............. B64U 20/80; B64U 2201/104; B64U 2201/20
See application file for complete search history.

(56) References Cited

U.S. PATENT DOCUMENTS

| | | | | |
|---|---|---|---|---|
| 5,034,759 | A * | 7/1991 | Watson .................. | B64U 10/30 |
| | | | | 396/7 |
| 8,011,615 | B2 * | 9/2011 | Silansky .................. | B64B 1/06 |
| | | | | 244/30 |
| 9,789,960 | B2 * | 10/2017 | Hoheisel ............... | H04N 23/60 |
| 9,981,740 | B2 | 5/2018 | Dunkelberger et al. | |
| 11,155,344 | B2 * | 10/2021 | Zhang .................... | B64C 25/52 |
| 11,275,383 | B2 | 3/2022 | Honjo et al. | |
| 11,307,374 | B2 * | 4/2022 | Koyama ............... | H04N 23/60 |

(Continued)

FOREIGN PATENT DOCUMENTS

| | | | | |
|---|---|---|---|---|
| CN | 118545239 A * | 8/2024 | ............. | B64U 20/30 |
| CN | 121134005 A * | 12/2025 | ............... | B60P 1/00 |
| WO | WO-2024182800 A1 * | 9/2024 | ............. | B64U 50/30 |

OTHER PUBLICATIONS

Mário Monteiro Marques, "STANAG 4586—Standard Interfaces of UAV Control System (UCS) for NATO UAV Interoperability", STO-EN-SCI-271, NATO Standardization Agency: Afeite, Portugal 14 (2012), 14 pages.

(Continued)

*Primary Examiner* — Brian M O'Hara

(74) *Attorney, Agent, or Firm* — Edell, Shapiro & Finnan, LLC

(57)　　　　　ABSTRACT

In an embodiment, a payload assembly is independent of a corresponding mobile platform (e.g. small unmanned aerial vehicle (sUAV), etc.). The payload assembly includes a flight controller (FC), a global positioning system (GPS) unit, a radio frequency (RF) telemetry unit, an RF antenna, a companion computer, and a power distribution system, thereby enabling both mobile platform and payload agnostic capabilities.

20 Claims, 5 Drawing Sheets

(56)                    References Cited

U.S. PATENT DOCUMENTS

| | | | |
|---|---|---|---|
| 11,447,248 | B2 | 9/2022 | Weekes et al. |
| 11,542,004 | B2 * | 1/2023 | Velazquez ................ B64D 5/00 |
| 12,097,981 | B2 * | 9/2024 | Soma .................... B64U 10/14 |
| 2009/0294573 | A1 | 12/2009 | Wilson et al. |
| 2013/0041528 | A1 | 2/2013 | Burke |
| 2017/0328678 | A1 | 11/2017 | Burke et al. |
| 2021/0003979 | A1 * | 1/2021 | Liu ........................ B64U 20/87 |
| 2021/0047039 | A1 * | 2/2021 | Infante Aguirre ....... B64D 1/22 |
| 2024/0140629 | A1 * | 5/2024 | Boomgaard ........... B64U 10/60 |
| 2024/0294278 | A1 * | 9/2024 | Ifju ....................... B63B 39/061 |
| 2024/0409246 | A1 * | 12/2024 | Van Der Jagt ......... B64U 10/14 |
| 2025/0067900 | A1 * | 2/2025 | Compere ............... G01W 1/08 |

OTHER PUBLICATIONS

"CubePilot EcoSystem Autopilot Wiring Diagram (Multilingual)", https://docs.cubepilot.org/user-guides/cubepilot-ecosystem/cubepilot-ecosystem-autopilot-wiring-diagram, downloaded from the internet Feb. 1, 2024, 11 pages.
"Jump 20" Group 3 VTOL Medium UAS, Defense VTOL Drone, AeroVironment, Inc., https://www.avinc.com/uas/jump-20, downloaded from the internet on Feb. 1, 2024, 8 pages.
Nicolas Giuditta, et al., "Automation and Interoperability Challenges for Heterogeneous UAS Fleet Management", ATACCS'2011, Industrial Papers, Barcelona, Spain, May 26-27, 2011, 6 pages.
"NATO Intelligence, Surveillance, and Reconnaissance (ISR) Interoperability Architecture (NIIA)", AEDP-2, Edition 1, Allied Engineering Documentation Publication, vol. 1: Architecture Description, Sep. 2005, 33 pages.

* cited by examiner

MOBILE PLATFORM CONTROLLER 110

PAYLOAD ASSEMBLY CONTROLLER 115

MOBILE PLATFORM 140

FLIGHT CONTROLLER 132

COMPANION COMPUTER 136

ESC 144

MOTORS 146

GPS UNIT 134

RF TELEMETRY UNIT 138

RF ANTENNA 135

POWER UNIT 142

COUPLING MECHANISM 146

COMPANION COMPUTER 165

GPS 160

POWER INPUT 175

FC 155

FC CARRIER BOARD 195

QUICK RELEASE 180

PAYLOAD 130

RF TELEM 170

173

185

190

150

120

100

MOBILE PLATFORM CONTROLLER
110

PAYLOAD ASSEMBLY CONTROLLER
115

MOBILE PLATFORM
140

160
155
195
245
280
205
173
170
175
255
295
180
285
260
165
210
235
240
225
215
215
220
370
365
230
250
263
280

300

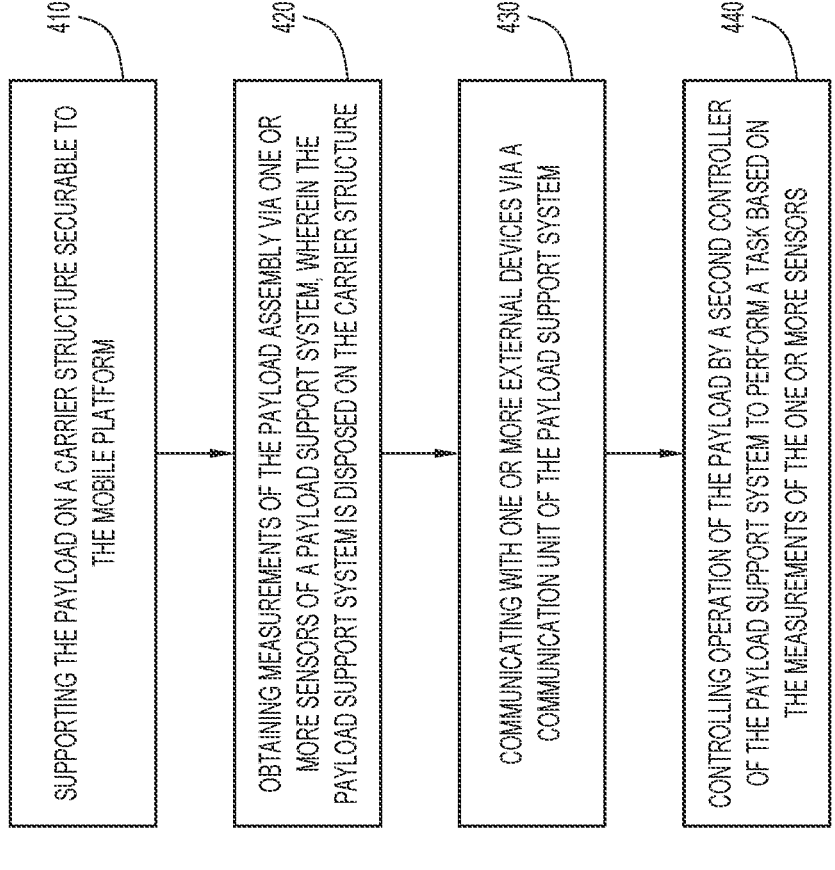

SUPPORTING THE PAYLOAD ON A CARRIER STRUCTURE SECURABLE TO THE MOBILE PLATFORM
410

OBTAINING MEASUREMENTS OF THE PAYLOAD ASSEMBLY VIA ONE OR MORE SENSORS OF A PAYLOAD SUPPORT SYSTEM, WHEREIN THE PAYLOAD SUPPORT SYSTEM IS DISPOSED ON THE CARRIER STRUCTURE
420

COMMUNICATING WITH ONE OR MORE EXTERNAL DEVICES VIA A COMMUNICATION UNIT OF THE PAYLOAD SUPPORT SYSTEM
430

CONTROLLING OPERATION OF THE PAYLOAD BY A SECOND CONTROLLER OF THE PAYLOAD SUPPORT SYSTEM TO PERFORM A TASK BASED ON THE MEASUREMENTS OF THE ONE OR MORE SENSORS
440

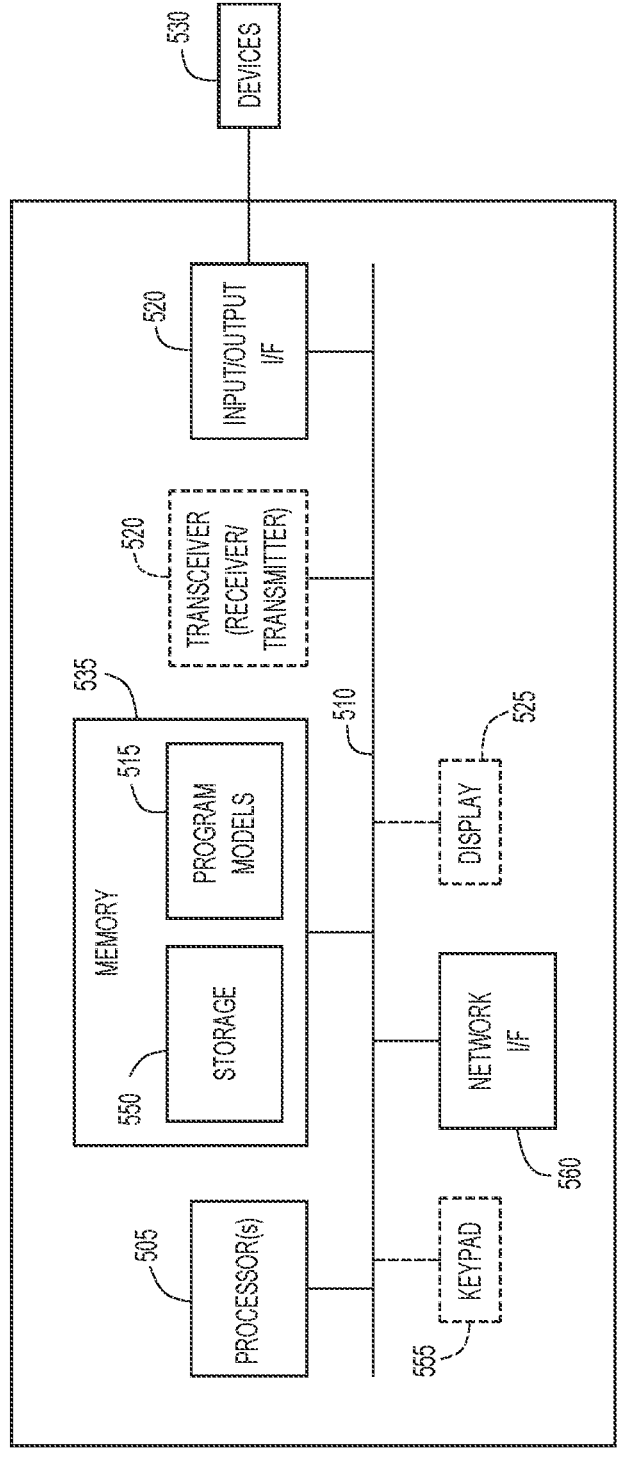
FIG.5

PAYLOAD ASSEMBLY FOR MOBILE PLATFORMS

STATEMENT REGARDING FEDERALLY SPONSORED RESEARCH OR DEVELOPMENT

This invention was made with government support under Contract No. FA864921P0777 awarded by U.S. Air Force Research Lab-RI. The government has certain rights in the invention.

TECHNICAL FIELD

The present disclosure relates generally to mobile platforms and, more specifically, to a configurable payload assembly for use with different payloads and/or mobile platforms.

BACKGROUND

There is a broad spectrum of mobile platforms (e.g., small unmanned aerial vehicles (sUAVs), etc.). Unfortunately, the vast differences in these mobile platforms may prohibit integration and interoperability with payloads. For example, current sUAV payloads and platforms are vastly different and rely heavily on particulars of an aircraft. Some aircraft may not have key components to support advanced payloads (i.e., many aircraft do not support an onboard companion computer connected via Micro Air Vehicle Link (MAV-LINK) commands to a flight controller (FC)). While sUAVs commonly have a flight controller (FC), they may or may not have accurate telemetry, a companion computer, radio communication links, or global positioning system (GPS) navigation. Further, industry trends employ various flight stacks or software, and are not standardized, secure, nor interoperable for payloads. Moreover, many sUAVs have inaccurate and/or non-redundant telemetry systems, and the majority of sUAVs are based on proprietary software.

Accordingly, each time a new payload and/or mobile platform is selected, a re-design for accommodating the new payload is needed. This provides several disadvantages including difficulty with respect to supporting advanced payloads, increasing costs, and lengthening development schedules.

BRIEF DESCRIPTION OF THE DRAWINGS

Generally, like reference numerals in the various figures are utilized to designate like components.

FIG. 4 is a flowchart of an example method of configuring a payload assembly for a mobile platform according to an embodiment of the present disclosure.

FIG. 5 is a block diagram of an example computing device according to an embodiment of the present disclosure.

DETAILED DESCRIPTION

Overview

Figure 1:
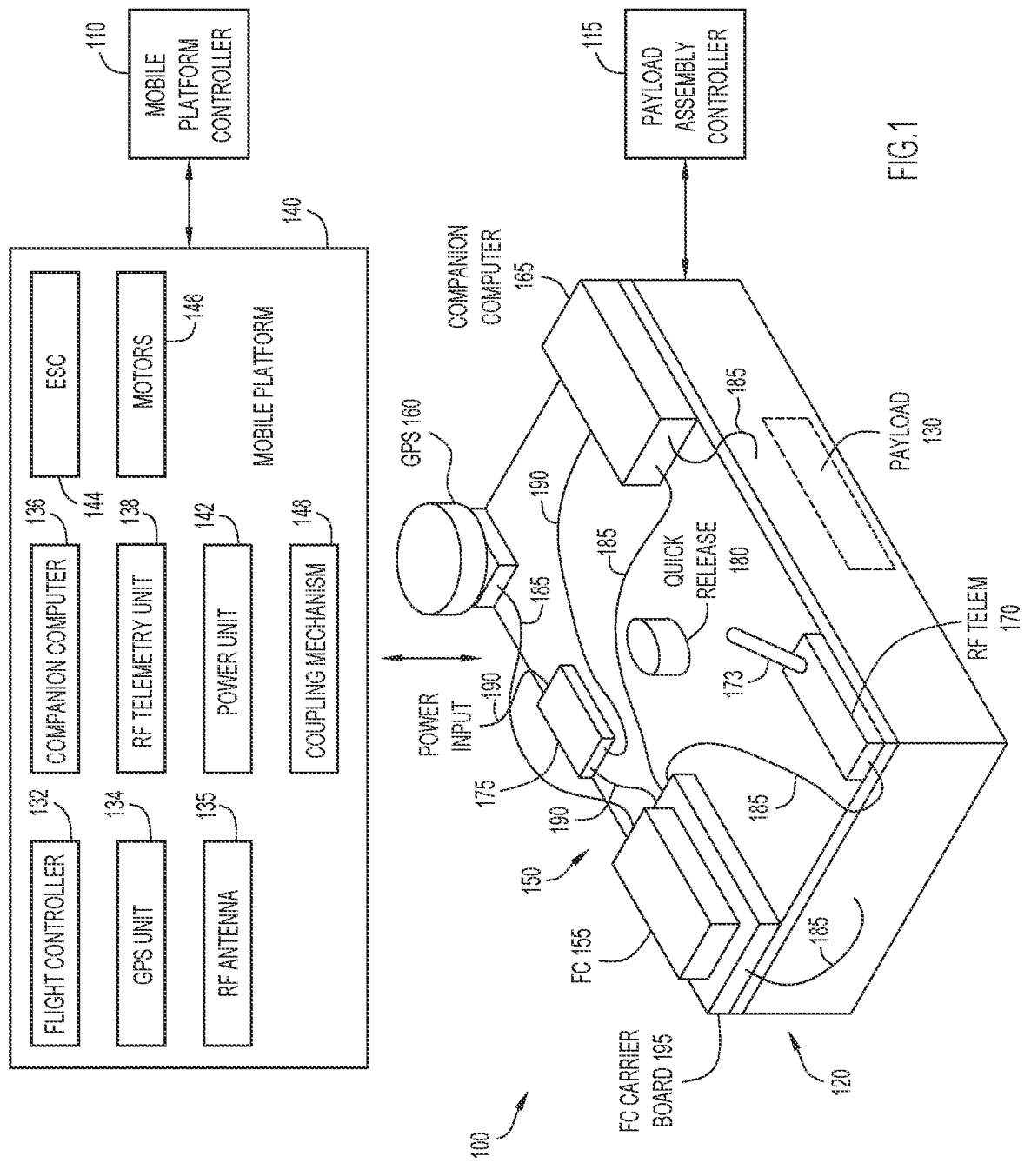
FIG. 1 is a block diagram of a payload assembly for a mobile platform according to an embodiment of the present disclosure.

In an embodiment, a payload assembly is independent of a corresponding mobile platform (e.g. small unmanned aerial vehicle (sUAV), etc.). The payload assembly includes a flight controller (FC), a global positioning system (GPS) unit (e.g., GPS antenna, GPS receiver, etc.), a radio frequency (RF) telemetry unit, an RF antenna, a companion computer, and a power distribution system, thereby enabling both mobile platform and payload agnostic capabilities.

Example Embodiments

An embodiment provides a payload assembly that is independent of a corresponding mobile platform (e.g. small unmanned aerial vehicle (sUAV), etc.). The payload assembly includes a flight controller (FC), a global positioning system (GPS) unit (e.g., GPS antenna, GPS receiver, etc.), a radio frequency (RF) telemetry unit, an RF antenna, a companion computer, and a power distribution system, thereby enabling both mobile platform and payload agnostic capabilities.

The payload assembly of an embodiment provides redundant and autonomous sensor data, telemetry data, computational support, and power. In other words, the payload assembly becomes its own autonomous system including communication capabilities. For example, the payload assembly may employ a Micro Air Vehicle Link (MAV-LINK) protocol for small unmanned aerial vehicles (sUAVs) that communicates between a ground control unit and an sUAV and/or provides inter-communication of components. The protocol may be used to transmit orientation, GPS location, speed, and other data. The open-source payload assembly is effectively an independent and redundant mobile platform system (e.g. small unmanned aerial vehicle (SUAV), etc.) (without the propellers, motors, electronic speed controllers (ESCs), etc.). The open-source nature of the payload assembly is readily adaptable to various component selection and configurations.

An embodiment provides several advantages. For example, the payload assembly provides independence from mobile platforms (e.g., small unmanned aerial vehicles (sUAV), etc.) and standardization for payload support. By way of example, mobile platforms may have different hardware and/or software configurations that may be incompatible with a payload (e.g., the software may be proprietary or incompatible with the payload, the hardware may not enable communication or connection to components needed by the payload, etc.). The payload assembly provides the needed support for the payload, thereby enabling use with different mobile platforms of varying configurations.

The payload assembly further provides redundant telemetry and sensors for payload support and data analysis. Accelerometry and/or other sensor data may be obtained directly from the payload assembly (and not from the sUAV or other mobile platform). The payload assembly is compatible with a broad class of mobile platforms (e.g., sUAVs, balloons, rovers, amphibious platforms, etc.), and provides Micro Air Vehicle Link (MAVLINK) communication and a companion computer uniform across multiple payloads. Moreover, the embodiment provides an easy and quick swap of one payload to another on the same sUAV or other mobile platform, or transfer of a payload to a different mobile platform for testing or adding interoperability to payloads on sUAVs or other mobile platforms. Since an sUAV platform may not have complete telemetry data or backup telemetry sensors, the payload assembly provides redundancy in telemetry data that may be used by the operator of the sUAV platform. Further, redundancy provided by the payload assembly (with respect to mobile platforms) may be useful for various scenarios (e.g., besides providing independence from the mobile platforms). For example, in situations where independence may or may not be needed, use of both the mobile platform and payload assembly systems may help maintain operations in degraded environments, protect against equipment failure by having a backup, and/or help improve accuracy of overall systems (such as positioning systems) by driving down error through use of two independent systems with related, but perhaps different sensitivities. By way of example, the redundancy enables communications with the mobile platform and payload assembly in different radio frequency (RF) or other bands (e.g., simultaneously and/or individually). This may be beneficial in situations or conditions in which communication is degraded between a ground unit (e.g., controller or station) and the mobile platform or payload assembly. In this case, successful communication with the mobile platform or payload assembly may be used to provide data and commands to the other, thereby providing more reliable communication in adverse scenarios. Further, the payload assembly may independently provide data to a ground station or mobile platform (e.g., sUAV, etc.) companion computer to provide indirect telemetry to help tie into the sUAV to aid the flight decisions for the SUAV.

By way of example, present embodiments are described with respect to a small unmanned aerial vehicle (SUAV). However, present embodiments may be applied to any mobile platform in substantially the same manner described below. As used herein and in the claims, the term "mobile platform" encompasses any platform capable of translational and/or rotational movement, including terrestrial vehicles (e.g., manned vehicles, unmanned ground rovers, etc.) and other terrestrial portable or temporary mounting platforms, airborne and spaceborne platforms (e.g., fixed-wing manned and unmanned aircraft, balloons, satellites, and small unmanned aerial vehicles (sUAV), such as a small, quad-copter drone), and seaborne platforms (e.g., ships, buoys, surface-located submarines, underwater sub-surface autonomous vehicles, etc.).

A payload assembly according to an embodiment of the present disclosure is illustrated in FIG. 1. Specifically, a payload assembly 100 includes a payload carrier or support structure 120 and a payload support system 150. Payload carrier structure 120 supports or contains a payload 130 for transport by a mobile platform 140 (e.g., a small unmanned aerial vehicle (sUAV), etc.). The payload may include any objects for transport (e.g., sensors, transmitters, receivers, computing devices, displays, image/video capture devices, deliverable items, etc.), and may be configured to perform various tasks (e.g., communication, image/video capture, etc.).

Mobile platform 140 may include components for communication and control of the mobile platform. By way of example, mobile platform 140 may be a conventional or other small unmanned aerial vehicle (sUAV), and include a flight controller 132, a radio frequency (RF) antenna 135 (and transceiver for commands and data), a power unit 142, electronic speed controllers (ESCs) 144, and motors (e.g., propellers or other motion mechanisms) 146. The mobile platform may further include a global positioning system (GPS) unit 134 (e.g., GPS antenna, GPS receiver, etc.), a companion computer 136, a radio frequency (RF) telemetry unit 138, and/or a coupling mechanism 148. Flight controller 132 may be implemented by any conventional or other flight controller, and detects mobile platform movements and receives commands from a user or mobile platform controller 110 (via signals from RF antenna 135) to control speed of motors 146 (via conventional or other ESCs 144) and direction of the mobile platform. The flight controller may include various sensors to obtain measurements to control the mobile platform (e.g., accelerometers, barometric pressure sensors, gyroscopes, inertial measurement unit (IMU), distance sensors, compasses, etc.). The RF antenna, ESCs, and motors may be implemented by any conventional or other components.

Mobile platform controller 110 is remote from the mobile platform, and may be implemented by any conventional or other wireless controller. The mobile platform controller directly sends commands to mobile platform 140 via radio frequency (RF) or other energy signals (e.g., free space optical links (FSO), etc.). The frequencies of the signals may be configurable and selected to provide a frequency band different than the frequency band used for sending commands to control the payload assembly as described below. This enables individual and separate control of the mobile platform and payload assembly.

Global positioning system (GPS) unit 134 may be implemented by, or include, any conventional or other GPS components (e.g., GPS antenna, GPS receiver, etc.), and receives and processes GPS signals from GPS satellites. The processed signals are provided to flight controller 132 and indicate a location of the mobile platform. Companion computer 136 may be implemented by any conventional or other computing device (e.g., processor, controller, computer, etc.), and controls flight controller 132 to perform higher level or more complex onboard (programmable) tasks.

Radio frequency (RF) telemetry unit 138 may be implemented by any conventional or other telemetry or communication unit, and enables the mobile platform to transfer data and commands with a ground unit (e.g., receiver, controller, station, etc.) via RF antenna 135. Power unit 142 may be implemented by any conventional or other power device or source, and distributes power for the mobile platform components. Coupling mechanism 148 may be implemented by any conventional or other fastening or coupling mechanism, and enables attachment and detachment of payload assembly 100 to mobile platform 140.

Payload support system 150 is coupled to payload carrier structure 120 and includes various components for supporting payload 130. This enables payload 130 to operate autonomously and independent of mobile platform 140 (e.g., the payload support system provides information and processing needed by the payload and does not need to rely on the mobile platform), and the payload assembly to be used across different mobile platforms (with minimal or no reconfiguration). The components of payload support system 150 include a flight controller 155, a global positioning system (GPS) unit 160 (e.g., GPS antenna, GPS receiver, etc.), a companion computer 165, a radio frequency (RF) telemetry unit 170, a radio frequency (RF) antenna 173, a power unit 175, and a quick release mechanism 180. Flight controller 155 may be implemented by any conventional or other flight controller (e.g., Pixhawk Cube Orange running Arducopter, etc.), and interfaces payload support system components to control those components and payload 130. The flight controller may include various sensors to obtain measurements to control the payload assembly (or payload) (e.g., accelerometers, barometric pressure sensors, gyroscopes, inertial measurement unit (IMU), distance sensors, compasses, etc.). The flight controller is coupled to a carrier board 195 (e.g., providing I/O and power functions for the flight controller, etc.). The carrier board may be implemented by any conventional or other devices for handling I/O and power. Flight controller 155 is further coupled (via carrier board 195) to components of payload carrier structure 120 (e.g., gimbal, etc.), payload 130, GPS unit 160, companion computer 165, and RF telemetry unit 170 via data cables 185 to exchange data.

Global positioning system (GPS) unit 160 may be implemented by, or include, any conventional or other GPS components (e.g., GPS antenna, GPS receiver, etc.), and receives and processes GPS signals from GPS satellites. The processed signals are provided to flight controller 155 and indicate a location of the payload assembly. Companion computer 165 may be implemented by any conventional or other computing device (e.g., processor, controller, Raspberry Pi, computer, etc.), and controls payload 130 for performance of high level or complex (programmable) tasks (e.g., control a sensing device, receiver, transmitter, display, mechanical device, etc.; capture images/video at certain times and/or locations; perform image processing/computer vision, etc.). The companion computer may include communication capabilities (e.g., radio frequency (RF) communications, Wifi (e.g., for communication over the Internet), etc.) to communicate with various devices (e.g., receiver, computing devices, payload, ground station or controller, another mobile platform, etc.). The companion computer is coupled to components of payload carrier structure 120 (e.g., gimbal, etc.) and payload 130 via data cables 185 to exchange data (e.g., sensor measurements, received signals, etc.).

Radio frequency (RF) telemetry unit 170 may be implemented by any conventional or other telemetry or communication unit, and enables the payload assembly to transfer data and commands with a ground unit (e.g., receiver, controller, station, etc.) via RF antenna 173. The RF antenna may be implemented by any conventional or other RF antenna. The RF telemetry unit preferably employs a Micro Air Vehicle Link (MAVLINK) protocol for communications. Power unit 175 may be implemented by any conventional or other power device. The power unit receives power from a power input (e.g., from mobile platform 140, a power source, payload, etc.) and distributes power via power cables 190 to flight controller 155 (via carrier board 195) and companion computer 165. Quick release mechanism 180 may be implemented by any conventional or other fastening or coupling mechanism (e.g., Freefly Toad In The Hole quick release, etc.), and enables attachment and detachment of payload assembly 100 to mobile platform 140.

A payload assembly controller 115 is remote from payload assembly 100, and may control the payload assembly (e.g., payload support system 150, payload 130, etc.). The payload assembly controller may be implemented by any conventional or other wireless controller, and directly sends commands (e.g., from a user, etc.) to the payload assembly via radio frequency (RF) or other signals. The frequencies of the signals may be configurable and selected to provide a frequency band different than the frequency band used for controlling mobile platform 140. This enables individual and separate control of the mobile platform and payload assembly.

Accordingly, payload assembly 100 provides redundant and autonomous sensor data, telemetry data, computational support, and power. In other words, the payload assembly becomes its own autonomous system including communication capabilities. This enables the payload assembly to provide independence from mobile platforms (e.g., small unmanned aerial vehicles (SUAV), etc.) and standardization for payload support. The redundant telemetry and sensors may be used for payload support and data analysis. Accelerometry and/or other sensor data may be obtained directly from the payload assembly (and not from the sUAV or other mobile platform). By way of example, mobile platforms may have different hardware and/or software configurations that may be incompatible with a payload (e.g., the software may be proprietary or incompatible with the payload, the hardware may not enable communication or connection to components needed by the payload, etc.). The payload assembly provides the needed support for the payload, thereby enabling use with different mobile platforms of varying configurations.

Further, in an embodiment, the payload assembly and mobile platform may interact with each other and share sensor data, communications, processing capabilities, and/or power.

The redundancy of the payload assembly provides independent communication with the mobile platform and payload assembly (e.g., via separate controllers 110, 115, etc.). This enables communications with the mobile platform and payload assembly in different radio frequency (RF) or other bands (e.g., simultaneously and/or individually), and improves communication in environments with conditions (e.g., weather, obstacles or objects, interference, etc.) degrading communication signals. For example, the independent communication (and bands) are beneficial in situations or conditions in which communication is degraded between a ground unit (e.g., controller or station) and the mobile platform or payload assembly. In this case, successful communication with the mobile platform or payload assembly may be used to provide data and commands to the other, thereby providing more reliable communication in adverse scenarios.

Further, the redundancy of the payload assembly provides enhanced sensing capabilities since readings from multiple sensors (e.g., sensors from the mobile platform and payload assembly) may be used. For example, geolocation information may be determined with greater accuracy (e.g., due to multiple GPS sensors, etc.). Further, sensing by the payload assembly may provide measurements directly measured on the payload assembly. This provides enhanced accuracy since measurements obtained by the mobile platform are relative to the mobile platform and may be inaccurate (or vary) from actual or true measurements of the payload assembly.

In addition, the redundancy of the payload assembly provides enhanced computing power as processing may be allocated among multiple computing devices (e.g. flight controller, companion computer, etc.) of the mobile platform and payload assembly.

Payload 130 may include various objects and be mounted on payload carrier structure 120. The payload and payload carrier structure may be configured with components in various arrangements. Payload carrier structure 120 is secured to mobile platform 140 via quick release mechanism 180 and coupling mechanism 148. Payload support system 150 is configured to interface with the payload and payload carrier structure (and optionally mobile platform 140) to control the payload to perform desired tasks. Once the tasks are completed, carrier structure 120 may receive a different payload for use with the same or different mobile platform, or may use the same payload on a different mobile platform (e.g., with a different hardware and/or software configuration, etc.). The payload support system is compatible with the new mobile platform to enable the payload assembly to be used across different payloads and mobile platforms. Thus, the payload assembly may be used across different mobile platforms that lack support for and/or are incompatible with the payload.

Figure 2:
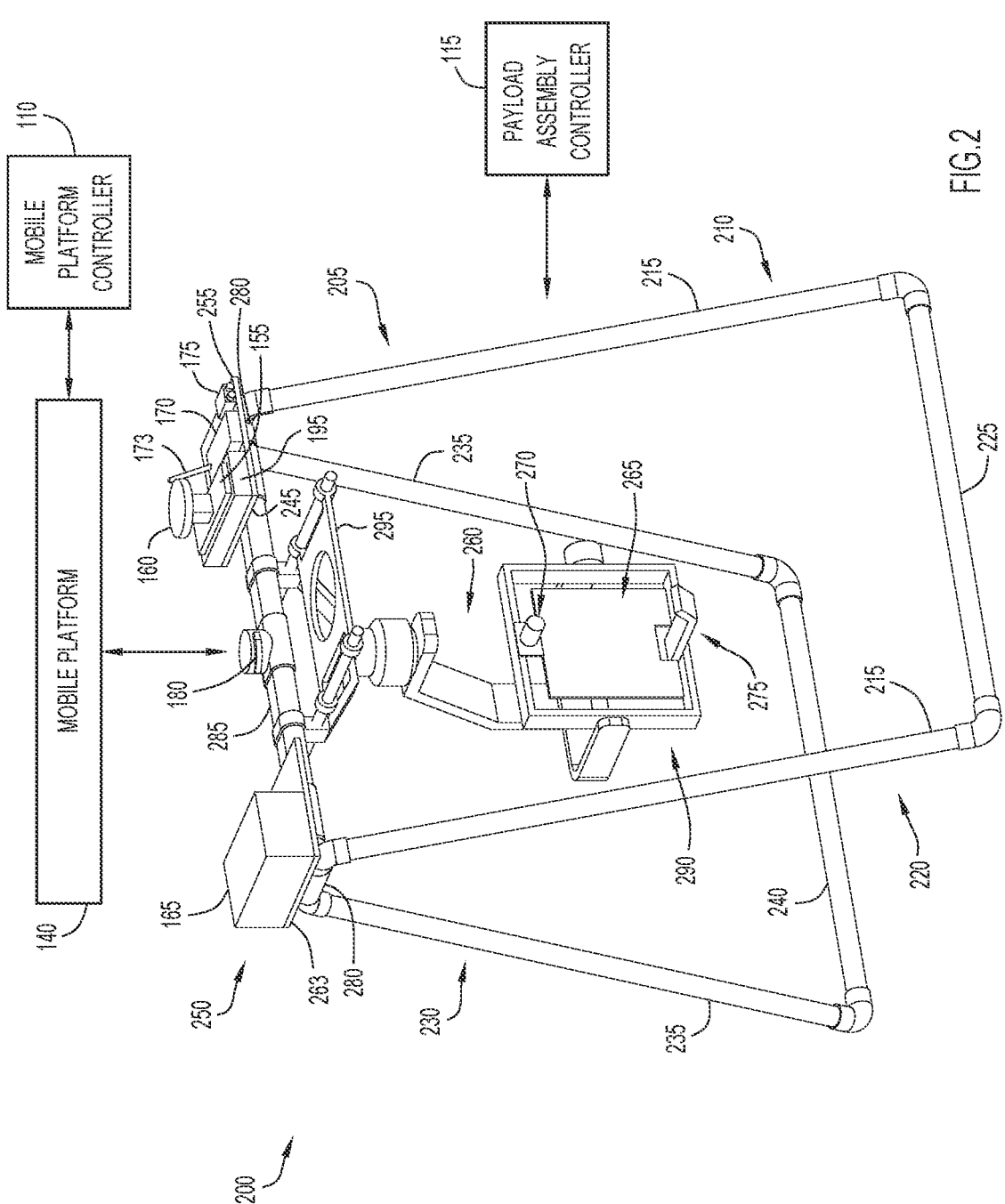
FIG. 2 is a view in perspective of a payload assembly configured for a payload in the form of a receiver according to an embodiment of the present disclosure.

An example payload assembly configured for a payload in the form of a receiver according to an embodiment of the present disclosure is illustrated in FIG. 2. Initially, payload assembly 200 includes a payload carrier or support structure 220 and a payload support system 250. The payload support system is substantially similar to payload support system 150 described above, and includes various components for a payload 290. The components include flight controller 155, global positioning system (GPS) unit 160, companion computer 165, radio frequency (RF) telemetry unit 170, RF antenna 173, power unit 175, and quick release mechanism 180, each substantially similar to the corresponding components described above. By way of example, payload 290 may include a receiver including a light surface 265, a camera 270 directed away from the light surface, and a boom camera 275 (disposed on a boom) and directed toward the light surface to detect light on the light surface from a transmitter (e.g., FIG. 3).

Payload carrier structure 220 may be implemented by any conventional or other structure (e.g., Freefly Alta X landing cage, etc.) that is modified to accommodate payload support system 250. By way of example, payload carrier structure 220 includes generally U-shaped front and rear frames 210, 230 coupled by side bars 280, and a top bar 285 extending between side bars 280. Front frame 210 includes substantially parallel front frame side bars 215 and a front frame bottom bar 225 disposed between and coupled to lower portions of the front frame side bars to form the generally U-shaped front frame. The upper portions of front frame side bars 215 are coupled to an end of a corresponding side bar 280.

Rear frame 230 includes substantially parallel rear frame side bars 235 and a rear frame bottom bar 240 disposed between and coupled to lower portions of the rear frame side bars to form the generally U-shaped rear frame. The upper portions of rear frame side bars 235 are coupled to an end of a corresponding side bar 280 (opposing the end of the corresponding side bar 280 coupled to front frame side bars 215). Thus, side bars 280 each extend between the upper portions of a corresponding front frame side bar 215 and a corresponding rear frame side bar 235. Top bar 285 extends between side bars 280 and includes quick release mechanism 180 disposed thereon towards a center of the top bar to couple payload assembly 200 to mobile platform 140. The mobile platform is substantially similar to the mobile platform described above. The front and rear frames are positioned with their upper frame portions angled toward each other to enable the carrier structure to stand (or be self-supported) when placed on a surface.

A gimbal 260 is coupled to and suspended from top bar 285. The gimbal preferably includes a dampener, and may be implemented by any conventional or other gimbal assembly (e.g., Gremsy T7 Gimbal, etc.). Payload 290 is mounted on gimbal 260 to enable the gimbal to maintain an orientation of the payload during motion of payload assembly 200 and/or mobile platform 140. The gimbal may be coupled to flight controller 155 and/or companion computer 165 to receive and provide orientation information and/or controls.

Payload carrier structure 220 is modified to include various supports or mounts to accommodate components of payload support system 250. For example, a generally rectangular base or panel 245 is disposed on top bar 285 toward a corresponding side bar 280 to support flight controller carrier board 195. The flight controller carrier board is coupled to flight controller 155. The flight controller and flight controller carrier board are substantially similar to flight controller 155 and flight controller carrier board 195 described above. Global positioning system (GPS) unit 160 is disposed on and coupled to flight controller 155, while radio frequency (RF) telemetry unit 170 and RF antenna 173 are disposed on base 245 adjacent and coupled to the flight controller. The RF telemetry unit employs a Micro Air Vehicle Link (MAVLINK) protocol for communication as described above. The GPS unit, RF telemetry unit, and RF antenna are substantially similar to GPS unit 160, RF telemetry unit 170, and RF antenna 173 described above. A generally rectangular base or panel 255 is disposed adjacent base 245 toward the corresponding side bar 280 to support power unit 175. The power unit is substantially similar to power unit 175 described above to distribute power to payload assembly 200.

A generally rectangular base or panel 263 is disposed on top bar 285 and a corresponding side bar 280 (opposing side bar 280 near power unit 175) to support companion computer 165. The companion computer is substantially similar to companion computer 165 described above, and is configured to control operation of payload 290 (or the receiver) to detect transmitted light. The companion computer employs a Micro Air Vehicle Link (MAVLINK) protocol and is coupled to flight controller 155, gimbal 260, and payload 290. The companion computer may be configured with software and/or hardware modules to control the receiver (e.g., cameras 270, 275) to perform a desired task (e.g., detect light pulses, image processing/computer vision, etc.).

In addition, payload carrier structure 220 may include one or more panels 295 extending frontward and secured to top bar 285 to support cables and/or other payload devices on payload carrier structure 220. The components of payload carrier structure 220 (e.g., bars, bases or panels, etc.) may be of any shape or size, may be constructed of any suitable materials, may be secured to the payload carrier structure at any locations, and may be arranged on the payload carrier structure in any fashion. By way of example, and with respect to certain mobile platforms (e.g., Freely East BFD SE8 sUAV, etc.), an embodiment may secure the gimbal and companion computer to the bottom of the sUAV, where space for the payload is accommodated by stock landing gear.

Payload carrier structure 220 is secured to mobile platform 140 via quick release mechanism 180 and coupling mechanism 148. Payload support system 250 is configured to interface with the payload (e.g., cameras 270, 275, etc.) (and optionally mobile platform 140) to control the payload to perform desired tasks (e.g., capture and/or process images captured by the cameras of the light surface, etc.) during operation of the mobile platform.

Figure 3:
FIG. 3 is a view in perspective of the payload of FIG. 2 configured for a different payload in the form of a transmitter according to an embodiment of the present disclosure.

Once the tasks are completed, payload carrier structure 220 may receive a different payload for use with the same or different mobile platform, or may use the same payload on a different mobile platform. An example payload assembly configured for a different payload in the form of a transmitter according to an embodiment of the present disclosure is illustrated in FIG. 3. Initially, payload assembly 300 is substantially similar to payload assembly 200 described above, but is arranged or configured to accommodate a payload 365 including, by way of example, a transmitter 370. The transmitter may transmit light detectable by payload 290 of FIG. 2. Payload assembly 300 includes payload carrier or support structure 220 and payload support system 250. The payload carrier structure is substantially similar to payload carrier structure 220 described above (FIG. 2). The payload support system is substantially similar to payload support system 250 described above (FIG. 2), but is configured to accommodate payload 365 (and transmitter 370). The components of payload support system 250 include flight controller 155, global positioning system (GPS) unit 160, companion computer 165, radio frequency (RF) telemetry unit 170, RF antenna 173, power unit 175, and quick release mechanism 180, each substantially similar to the corresponding components described above.

Payload support system 250 is re-arranged on payload carrier structure 220 (relative to FIG. 2) and configured to accommodate payload 365 (and transmitter 370). For example, flight controller carrier board 195 is supported by base 245 disposed on top bar 285 toward a corresponding side bar 280 as described above. The flight controller carrier board is coupled to flight controller 155, and global positioning system (GPS) unit 160 is disposed on and coupled to flight controller 155 as described above. Radio frequency (RF) telemetry unit 170 and RF antenna 173 are disposed on base 245 adjacent and coupled to the flight controller as described above. However, generally rectangular base or panel 255 is disposed adjacent base 245 on a side toward the center of top bar 285 to support power unit 175.

Gimbal 260 is coupled to and suspended from top bar 285 as described above. In this case, payload 365 (or transmitter 370) is mounted on gimbal 260. In addition, companion computer 165 is mounted on gimbal 260 above the transmitter (e.g., base 263 does not contain the companion computer as viewed in FIG. 3), and is configured to control operation of payload 365 (or transmitter 370) to transmit light. The companion computer is coupled to flight controller 155, gimbal 260, and payload 365, and may be configured with software and/or hardware modules to control the transmitter to perform a desired task (e.g., transmit light pulses, etc.).

Payload carrier structure 220 is secured to mobile platform 140 via quick release mechanism 180 and coupling mechanism 148. Payload support system 250 is configured to interface with payload 365 (e.g., transmitter 370, etc.) (and optionally mobile platform 140) to control the payload to perform desired tasks during operation of the mobile platform. Once the tasks are completed, payload carrier structure 220 may receive a different payload for use with the same or different mobile platform, or may use the same payload on a different mobile platform.

FIG. 4 illustrates a method 400 performed by an embodiment to control a payload of a payload assembly for a mobile platform. The mobile platform includes a first controller to control the mobile platform based on sensor measurements of the mobile platform. In operation 410, the payload is supported on a carrier structure securable to the mobile platform. In operation 420, measurements of the payload assembly are obtained via one or more sensors of a payload support system. The payload support system is disposed on the carrier structure. In operation 430, a communication unit of the payload support system communicates with one or more external devices. In operation 440, operation of the payload is controlled by a second controller of the payload support system to perform a task based on the measurements of the one or more sensors.

An example of a computing or control device 500 (e.g., mobile platform controller 110, payload assembly controller 115, flight controllers 132, 155, companion computers 136,

165, etc.) is illustrated in FIG. 5. The example computing device may perform the functions of embodiments described herein. Computing device 500 may be implemented by any personal or other type of computer or processing system (e.g., embedded processor, microprocessor, controller, etc.), and may be used for any computing environments (e.g., embedded, local, network computing, stand-alone systems, etc.).

Computing device 500 may include one or more processors 505 (e.g., microprocessor, controller, central processing unit (CPU), etc.), network interface 560, memory 535, a bus 510, and an Input/Output interface 520. Bus 510 couples these components for communication, and may be of any type of bus structure, including a memory bus or memory controller, a peripheral bus, and a processor or local bus using any of a variety of conventional or other bus architectures. Memory 535 is coupled to bus 510 and typically includes computer readable media including volatile media (e.g., random access memory (RAM), cache memory, etc.), non-volatile media, removable media, and/or non-removable media. For example, memory 535 may include storage 550 containing nonremovable, non-volatile media.

Moreover, memory 535 includes a set of program modules 515 that are configured to perform functions of embodiments described herein. The memory may further include an operating system, at least one application and/or other modules, and corresponding data. These may provide an implementation of a networking environment.

Input/Output interface 520 is coupled to bus 510 and communicates with one or more peripheral or external devices 530 (e.g., a keyboard, mouse or other pointing device, a display, sensing devices, etc.), at least one device that enables a user to interact with computing device 500, and/or any device (e.g., network card, modem, etc.) that enables computing device 500 to communicate with one or more other computing devices. Computing device 500 may communicate with one or more networks (e.g., a local area network (LAN), a wide area network (WAN), a public network (e.g., the Internet), etc.) via network interface 560 coupled to bus 510.

With respect to certain entities (e.g., mobile platform controller 110, payload assembly controller 115, etc.), computing device 500 may further include, or be coupled to, a touch screen or other display 525, a transceiver (e.g., receiver and transmitter to communicate commands and/or other data, etc.), and/or input mechanisms 555 (e.g., keypad, keyboard, actuators, joystick, etc.) to enter information (e.g., alphanumeric information, commands, etc.). These items may be coupled to bus 510 or Input/Output interface 520 to transfer data with other elements of computing device 500.

In summary, in some aspects, the techniques described herein relate to a payload assembly for a mobile platform, wherein the mobile platform includes a first controller to control the mobile platform based on sensor measurements of the mobile platform, the payload assembly comprising: a carrier structure securable to the mobile platform to support a payload; and a payload support system disposed on the carrier structure and comprising: one or more sensors to obtain measurements of the payload assembly; a communication unit to communicate with one or more external devices; and a second controller to control operation of the payload to perform a task based on the measurements of the one or more sensors.

In some aspects, the techniques described herein relate to a mobile platform being an aerial vehicle, and the first and second controllers including flight controllers.

In some aspects, the techniques described herein relate to the first controller being incompatible with the payload.

In some aspects, the techniques described herein relate to the payload assembly being operable with mobile platforms having different hardware and/or software configurations.

In some aspects, the techniques described herein relate to the payload support system further including a computing device to control the payload to perform programmable operations and provide communication with a ground unit.

In some aspects, the techniques described herein relate to the one or more sensors including a global positioning system unit to receive signals indicating a location of the payload assembly.

In some aspects, the techniques described herein relate to the second controller processing measurements from the one or more sensors of the payload support system and at least one sensor of the mobile platform to control the payload.

In some aspects, the techniques described herein relate to the second controller determining a location of the payload assembly based on global positioning signals received by the payload support system and the mobile platform.

In some aspects, the techniques described herein relate to the mobile platform being controlled by a mobile platform controller remote from the mobile platform, and the payload assembly further comprises a payload assembly controller remote from the payload assembly to directly control operation of the payload assembly independent of the mobile platform.

In some aspects, the techniques described herein relate to the payload assembly controller using a frequency band for communicating with the payload assembly different than a frequency band used by the mobile platform controller for communicating with the mobile platform.

In some aspects, the techniques described herein relate to a method of controlling a payload of a payload assembly for a mobile platform, wherein the mobile platform includes a first controller to control the mobile platform based on sensor measurements of the mobile platform, the method comprising: supporting the payload on a carrier structure securable to the mobile platform; obtaining measurements of the payload assembly via one or more sensors of a payload support system, wherein the payload support system is disposed on the carrier structure; communicating with one or more external devices via a communication unit of the payload support system; and controlling operation of the payload by a second controller of the payload support system to perform a task based on the measurements of the one or more sensors.

In some aspects, the techniques described herein relate to the method of controlling a payload of a payload assembly, wherein the mobile platform is an aerial vehicle, and the first and second controllers include flight controllers.

In some aspects, the techniques described herein relate to the method of controlling a payload of a payload assembly, wherein the first controller is incompatible with the payload.

In some aspects, the techniques described herein relate to the method of controlling a payload of a payload assembly, wherein the payload assembly is operable with mobile platforms having different hardware and/or software configurations.

In some aspects, the techniques described herein relate to the method of controlling a payload of a payload assembly, wherein the payload support system further includes a computing device, and the method further comprises controlling the payload to perform programmable operations and providing communication with a ground unit via the computing device.

In some aspects, the techniques described herein relate to the method of controlling a payload of a payload assembly, wherein the one or more sensors include a global positioning system unit to receive signals indicating a location of the payload assembly.

In some aspects, the techniques described herein relate to the method of controlling a payload of a payload assembly, wherein controlling operation of the payload further comprises processing, via the second controller, measurements from the one or more sensors of the payload support system and at least one sensor of the mobile platform to control the payload.

In some aspects, the techniques described herein relate to the method of controlling a payload of a payload assembly, wherein controlling operation of the payload further comprises determining, via the second controller, a location of the payload assembly based on global positioning signals received by the payload support system and the mobile platform.

In some aspects, the techniques described herein relate to the method of controlling a payload of a payload assembly, wherein the mobile platform is controlled by a mobile platform controller remote from the mobile platform, and the method further comprises directly controlling operation of the payload assembly independent of the mobile platform via a payload assembly controller remote from the payload assembly.

In some aspects, the techniques described herein relate to the method of controlling a payload of a payload assembly, wherein the payload assembly controller uses a frequency band for communicating with the payload assembly different than a frequency band used by the mobile platform controller for communicating with the mobile platform.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A payload assembly for a mobile platform, the payload assembly comprising:
   a carrier structure containing a payload and configured as a landing structure for the mobile platform, the carrier structure including:
      a front frame and a rear frame each with upper portions coupled to a bar extending between sides of the front and rear frames;
      a gimbal mechanism suspended from the bar and configured to support and control orientation of the payload relative to the carrier structure; and
      a quick release mechanism disposed on the bar to secure the payload assembly to the mobile platform; and
   a payload support system disposed on the carrier structure and comprising:
      one or more sensors to obtain measurements of the payload assembly directly measured on the payload assembly;
      a communication unit configured to communicate with one or more external devices, wherein the one or more external devices include a payload assembly controller remote from the payload assembly and mobile platform and configured to directly send commands to the payload assembly; and a flight controller configured to control operation of the gimbal mechanism and the payload to perform a task based on the measurements of the payload assembly from the one or more sensors and the commands received from the payload assembly controller, wherein the payload assembly is operational with different mobile platforms each having a different software and/or hardware configuration.

2. The payload assembly of claim 1, wherein the mobile platform is an aerial vehicle.

3. The payload assembly of claim 2, wherein the flight controller is independent of the mobile platform.

4. The payload assembly of claim 1, wherein the payload assembly is operable independent of the mobile platform.

5. The payload assembly of claim 1, wherein the payload support system further includes a computing device to control the payload to perform programmable operations and provide communication with a ground unit.

6. The payload assembly of claim 1, wherein the one or more sensors include a global positioning system unit to receive signals indicating a location of the payload assembly.

7. The payload assembly of claim 1, wherein the flight controller processes measurements from the one or more sensors of the payload support system and at least one sensor of the mobile platform to control the payload.

8. The payload assembly of claim 7, wherein the flight controller determines a location of the payload assembly based on global positioning signals received by the payload support system and the mobile platform.

9. The payload assembly of claim 1, wherein the payload assembly controller directly controls operation of the payload assembly independent of the mobile platform.

10. The payload assembly of claim 1, wherein the payload assembly controller uses a frequency band for communicating with the payload assembly different than a frequency band used by a mobile platform controller for communicating with the mobile platform.

11. A method of controlling a payload of a payload assembly for a mobile platform, the method comprising:

supporting the payload on a carrier structure of the payload assembly, wherein the carrier structure is configured as a landing structure for the mobile platform and includes a front frame and a rear frame each with upper portions coupled to a bar extending between sides of the front and rear frames, a gimbal mechanism suspended from the bar and configured to support and control orientation of the payload relative to the carrier structure, and a quick release mechanism disposed on the bar to secure the payload assembly to the mobile platform;

obtaining measurements of the payload assembly via one or more sensors of a payload support system of the payload assembly, wherein the payload support system is disposed on the carrier structure and the one or more sensors directly measure the payload assembly;

communicating with one or more external devices via a communication unit of the payload support system, wherein the one or more external devices include a payload assembly controller remote from the payload assembly and mobile platform to directly send commands to the payload assembly; and controlling operation of the gimbal mechanism and the payload by a flight controller of the payload support system to perform a task based on the measurements of the payload assembly from the one or more sensors and the commands received from the payload assembly controller, wherein the payload assembly is operational with different mobile platforms each having a different software and/or hardware configuration.

12. The method of claim 11, wherein the mobile platform is an aerial vehicle.

13. The method of claim 12, wherein the flight controller is independent of the mobile platform.

14. The method of claim 11, wherein the payload assembly is operable independent of the mobile platform.

15. The method of claim 11, wherein the payload support system further includes a computing device, and the method further comprises:

controlling the payload to perform programmable operations and providing communication with a ground unit via the computing device.

16. The method of claim 11, wherein the one or more sensors include a global positioning system unit to receive signals indicating a location of the payload assembly.

17. The method of claim 11, wherein controlling operation of the payload further comprises:

processing, via the flight controller, measurements from the one or more sensors of the payload support system and at least one sensor of the mobile platform to control the payload.

18. The method of claim 17, wherein controlling operation of the payload further comprises:

determining, via the flight controller, a location of the payload assembly based on global positioning signals received by the payload support system and the mobile platform.

19. The method of claim 11, further comprising:

directly controlling operation of the payload assembly independent of the mobile platform via the payload assembly controller.

20. The method of claim 11, wherein the payload assembly controller uses a frequency band for communicating with the payload assembly different than a frequency band used by a mobile platform controller for communicating with the mobile platform.

* * * * *